(12) United States Patent
Hsu

(10) Patent No.: US 7,325,540 B2
(45) Date of Patent: Feb. 5, 2008

(54) BARBECUE STOVE WITH BURNER

(76) Inventor: Huang-Hsi Hsu, 8F., No. 14, Lane 252, Chungshan N. Rd., Sec. 6, Taipei (TW)

( * ) Notice: Subject to any disclaimer, the term of this patent is extended or adjusted under 35 U.S.C. 154(b) by 0 days.

(21) Appl. No.: 11/388,006

(22) Filed: Mar. 24, 2006

(65) Prior Publication Data

US 2007/0221193 A1 Sep. 27, 2007

(51) Int. Cl.
*A47J 37/00* (2006.01)
*F24B 3/00* (2006.01)
(52) U.S. Cl. ............... 126/25 R; 126/25 A; 126/25 B; 126/30; 126/40
(58) Field of Classification Search ............ 126/25 R, 126/25 A, 25 B, 26, 30, 40, 37 B, 9 R
See application file for complete search history.

(56) References Cited

U.S. PATENT DOCUMENTS 3,605,653 A * 9/1971 Donnell .................... 126/25 B 6,827,076 B2 * 12/2004 Crawford et al. ......... 126/25 R

* cited by examiner

*Primary Examiner*—Alfred Basichas
(74) *Attorney, Agent, or Firm*—Bacon & Thomas, PLLC

(57) ABSTRACT

The invention is related a barbecue stove with burner, which comprises a stove having an internal space for accommodating solid fuel and meat to be broiled, an opening being formed on a peripheral wall of the stove, and an end of an external bracket secured near the peripheral wall of the stove proximate the opening and the other end thereof provided with a burner. By moving the external bracket, the external bracket carries a nozzle of the burner through the opening into the space for burning the solid fuel. Alternatively, it is adapted to move the burner away from the opening of the stove in a non-operating status. By utilizing this barbecue stove, either the nozzle will not be activated of the burning in the stove for a relatively long time or the nozzle will not be clogged by food residue or grease. As a result, the burner will remain its burning function.

3 Claims, 5 Drawing Sheets

BARBECUE STOVE WITH BURNER

FIELD OF THE INVENTION

The present invention relates to barbecue stoves and more particularly to a barbecue stove having a movable external bracket, the external bracket which carries a burner is able to be moved close the barbecue stove to burning fuel in the barbecue stove.

BACKGROUND OF THE INVENTION

Leisure life is becoming more important as time evolves. An activity for social functions like family and friends reunion, for example, barbecue stove thus is very popular among people recently. However, some models of the barbeque stoves available in the market still are designed dull, non-ergonomic, and impractical. Now, put our thinking on this way, there are two barbecue stoves with same price for choosing. One is better in user-friendliness and utility rather than another one. Obviously, the one with better user-friendly and utility will be the key factor for consumers to choose barbeque stoves. Moreover, it is understood that the market of barbecue tackles is very competitive and cut-throat. Therefore, the manufacturers or designers in barbeque tackles industry who are unable to produce practical and user-friendly barbeque stove will lost their market sharing.

In FIG. 1, a conventional barbecue stove is shown. The barbecue stove does not need embers to start a new fire by burning solid fuel (e.g., charcoal, timber or the like). Instead, a burner 500 having a gas can is used to burn fuel 12 in the barbecue stove until a predetermined temperature. The barbecue stove is implemented as a stove 100 and a rack (not shown) is mounted to a waist portion thereof. An internal space 13 is defined by the stove 100. Fuel 12 is filled in the space 13. A circular opening 120 is formed on a peripheral wall of the stove 100, and secure the burner 500 to the peripheral wall of the stove 100 by fastening at the opening 120. A nozzle 501 of the burner 500 is anchored across the opening 120 to extend into the space 13 for burning the fuel 12. For broiling meat by means of the barbecue stove, a user may activate the burner 500 to burn the fuel 12 by passing through the opening 120 of the stove 100 until a predetermined temperature is reached as the fuel 12 burns.

However, the prior art barbecue stove suffered from a couple of disadvantages. For example, one end of the nozzle 501 of the burner 500 may be clogged by objects (e.g., ash, dressing, grease, or like) in the stove 100 because the nozzle 501 of the burner 500 is irremovable from the opening 120. As such, a working time of the burner 501 in the stove 100 can be limited. Alternatively, it is clogged by food residue or grease, resulting in an inactivation of the burning of the nozzle 501. This may not only limit a useful life of the burner 500 but also bring a great inconvenience in use. Thus, it is desirable to provide a cost effective barbecue stove having an improved burner in order to overcome the inadequacies (e.g., nozzle clog, use inconvenience) of the prior art.

SUMMARY OF THE INVENTION

After considerable research and experimentation, a barbecue stove having a burner according to the present invention has been devised so as to overcome the above drawbacks of the prior art.

It is an object of the present invention to provide a barbecue stove comprising a stove and an external bracket. The stove has an internal space for accommodating solid fuel and meat to be broiled. An opening is formed on a peripheral wall of the stove. One end of the external bracket is provided near the peripheral wall of the stove proximate the opening and the other end thereof is provided with a burner. By moving the external bracket, the external bracket can carry a nozzle of the burner through the opening into the space for burning the solid fuel. Alternatively, it is adapted to move the burner away from the opening of the stove in a non-operating status. By utilizing this barbecue stove, either the nozzle will not be activated of the burning in the stove for a relatively long time or the nozzle will not be clogged by food residue or grease. As a result, the burner will remain its burning function.

The above and other objects, features and advantages of the present invention will become apparent from the following detailed description taken with the accompanying drawings.

DETAILED DESCRIPTION OF THE PREFERRED EMBODIMENTS

Figure 1:
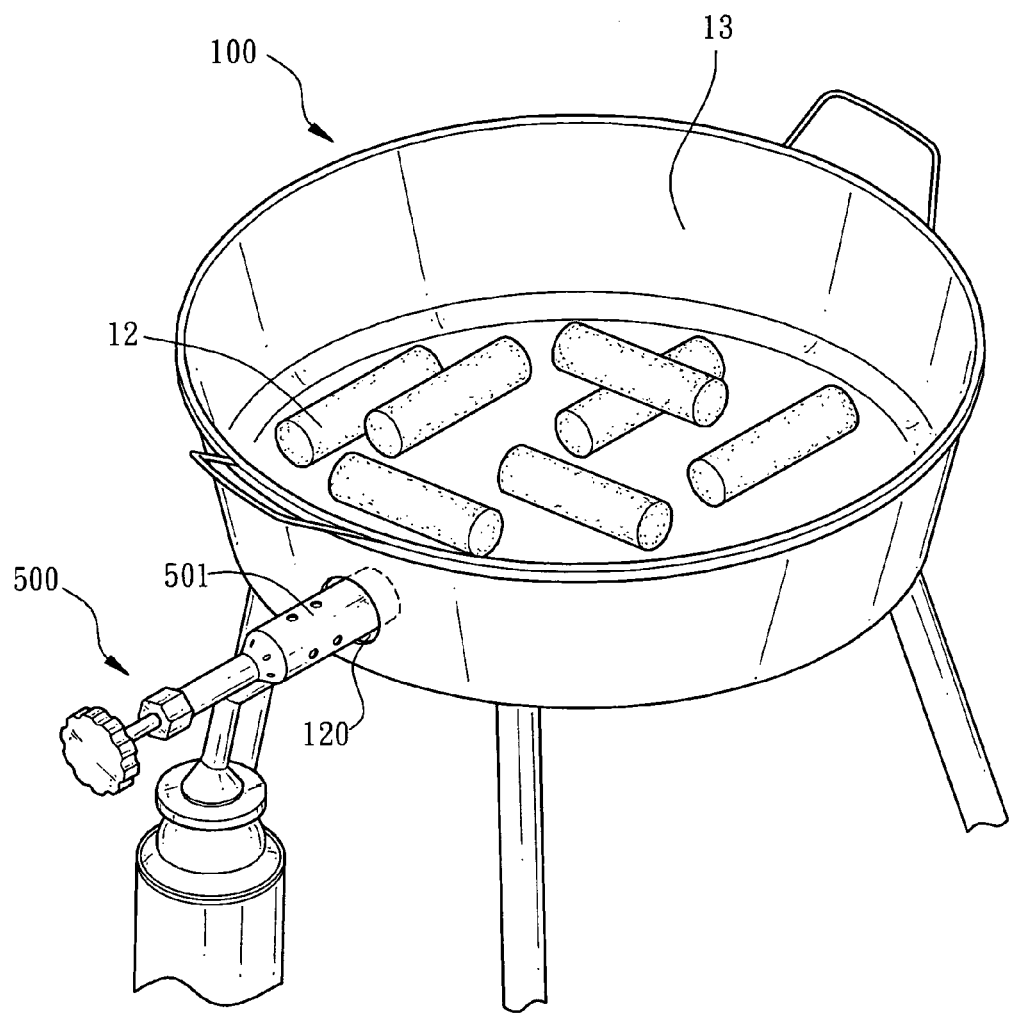
FIG. 1 is a perspective view of a conventional barbecue stove having a burner.
Figure 2:
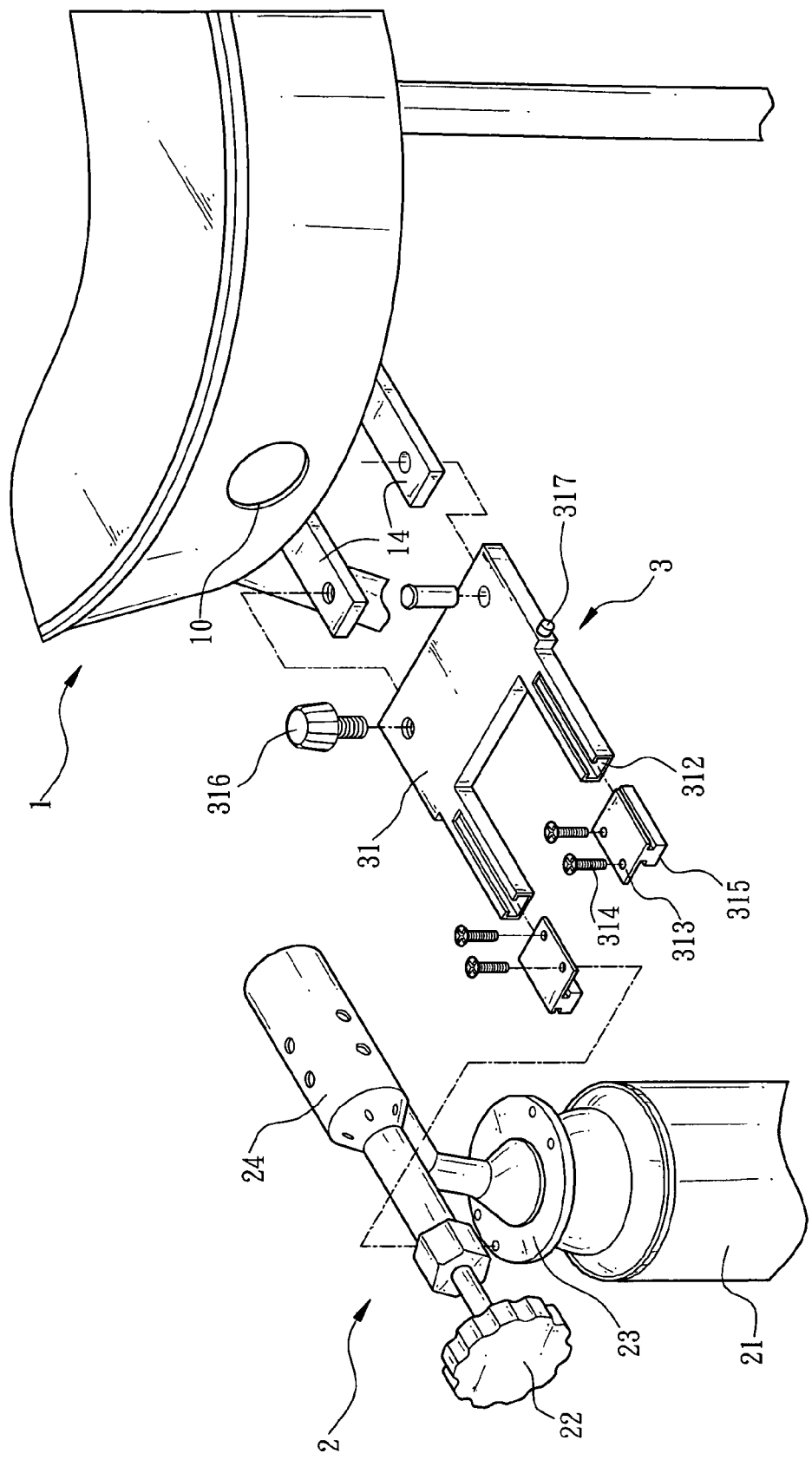
FIG. 2 is an exploded perspective view of a first preferred embodiment of burner to be assembled with a barbecue stove according to the invention.

Referring to FIG. 2, a barbecue stove in accordance with a first preferred embodiment of the invention is shown. The barbecue stove comprises a stove 1 having an internal space 13 (see FIG. 1). Solid fuel 12 and meat to be broiled (not shown) are placed in the space 13. A circular opening 10 is formed on a peripheral wall of the stove 1 and is proximate the fuel 12 (see FIG. 1). One end of an external bracket 3 is provided near the peripheral wall of the stove 1 proximate the opening 10. The other end of the external bracket 3 is adapted to move close to or away from the opening 10. A burner 2 is provided at the other end of the external bracket 3. In use, a user may pivotably move the external bracket 3 to dispose a nozzle 24 of the burner 2 through the opening 10 into the space 13 for burning the fuel 12 (see FIG. 1). Alternatively, the user may move the burner 2 away from the peripheral wall of the stove 1 in a non-operating position. As such, the nozzle 24 will not activate in the stove 1 for a relatively long time. Alternatively, the nozzle 24 will not be clogged by food residue or grease. As a result, the desired burning function of the nozzle 24 will remain the same.

Referring to FIG. 2 again, in addition to the nozzle 24, the burner 2 further comprises a fuel reservoir 21, a control 22, and a disc member 23. The fuel reservoir 21 is filled with fuel (e.g., gas). A top of the disc member 23 is in fluid communication with the nozzle 24. The control 22 is provided at a distal end of the nozzle 24 and is adapted to adjust an amount of fuel fed to the nozzle 24. A bottom of the disc member 23 opposite the nozzle 24 is in fluid communication with a top open end of the fuel reservoir 21. With controlling by the control 22, fuel in the fuel reservoir 21 may feed to the nozzle 24 through the disc member 23. Eventually, fuel is burned in the nozzle 24.

Figure 3:
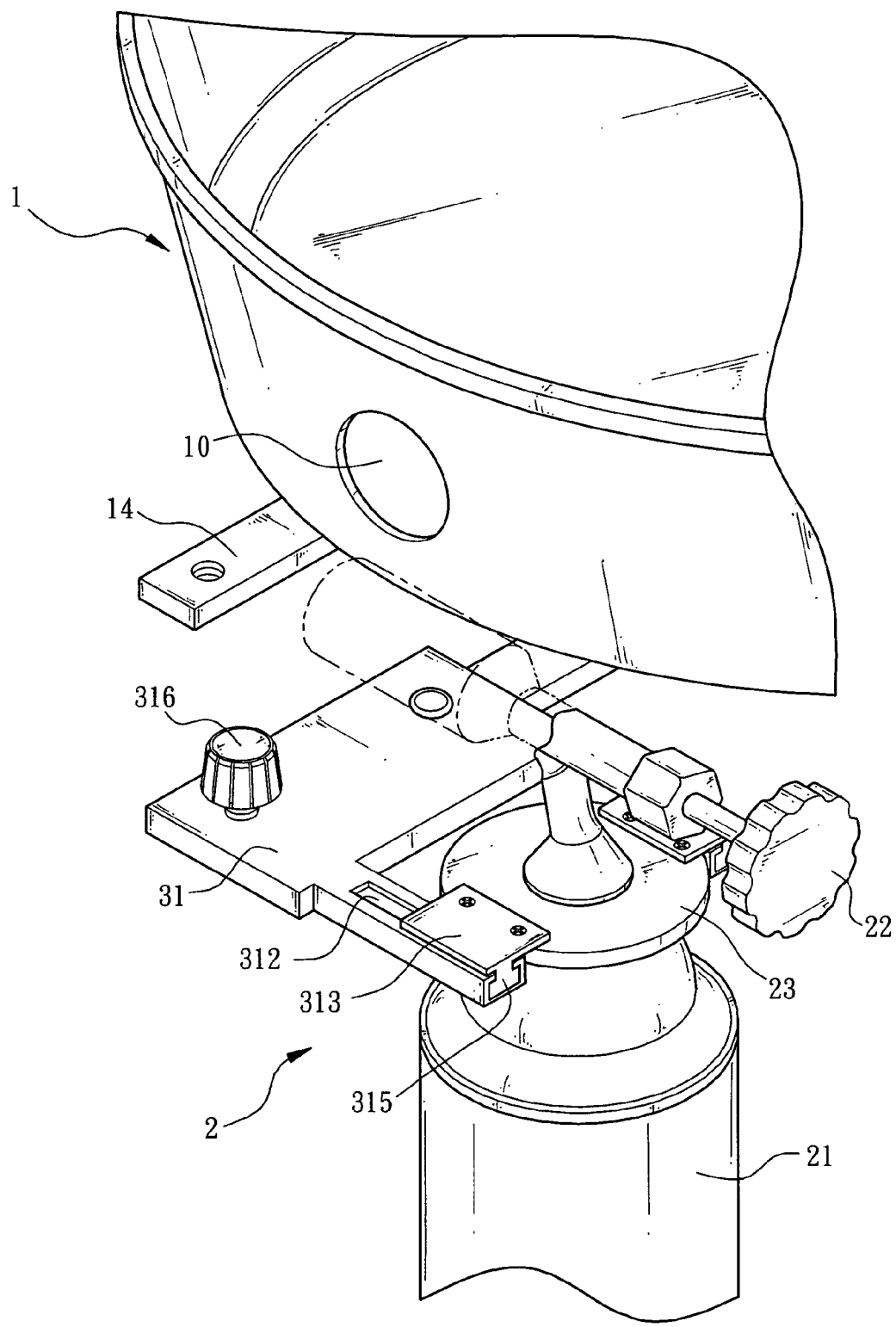
FIG. 3 is a perspective view of the assembled burner of FIG. 2 mounted at a periphery of the barbecue stove.

Referring to FIG. 3 in conjunction with FIG. 2, in the first preferred embodiment of the invention two elongate plate-shaped braces 14 are extended from a bottom of the stove 1. The braces 14 are in parallel with the opening 10 being disposed above a midpoint between the braces 14. The external bracket 3 comprises a rectangular, plate-shaped first body 31 having one corner at one end pivotably secured to one brace 14. Thus, the external bracket 3 may pivot about one brace 14 to move close to or away from the opening 10. The other corner at its one end of the first body 31 is adapted to fasten on the other brace 14. In this position, the burner 2 faces the opening 10 and the other brace 14 is adapted to support the burner 2. The first body 31 comprises two grooves 312 extended from two corners at its other end distal of the stove 1. The groove 312 has a U-section. Two opposite sliding blocks 313 are provided on the disc member 23 with the nozzle 24 being disposed above a midpoint between the sliding blocks 313. At least two fasteners (e.g., screws) 314 are driven through either sliding block 313 into the disc member 23 for fastening. The sliding block 313 comprises an I-shaped rail 315 on its bottom facing the fuel reservoir 21. The rails 315 are adapted to slide into the grooves 312 or out of same. The burner 2 may move close to the opening 10 by pivoting the external bracket 3 about the opening 10. Next, align the nozzle 24 with the opening 10 prior to sliding the sliding blocks 313 along the grooves 312 toward the opening 10 and moving the nozzle 24 into the space 13 through the opening 10 (see FIG. 1). Finally, activate the burner 2 to burn the fuel.

Referring to FIGS. 2 and 3 again, in the preferred embodiment, a fastener (e.g., thumb screw as shown or plug) 316 is driven through one corner at one end of the first body 31 into the other brace 14 for securing one end of the external bracket 3 (i.e., the first body 31) to the other brace 14. As a result, one end of the external bracket 3 is securely placed on the other brace 14. The external bracket 3 is held by the braces 14 in a balanced position with the burner 2 being supported. At least one engagement member (e.g., magnetic member) 317 is projected from a side surface at a corner of the other end of the first body 31 distal the corner of one end thereof pivotably secured to one brace 14. When the burner 2 is not in operation, a user may detach the fastener 316 from the other brace 14 and then pivot and move the external bracket 3 away from the opening 10 in order to dispose the external bracket 3 at a position distal the opening 10 of the stove 1. Finally, by the engagement member 317, the external bracket 3 is deposited on the peripheral wall of the stove 1 so as to secure the external bracket 3 thereto.

Figure 4:
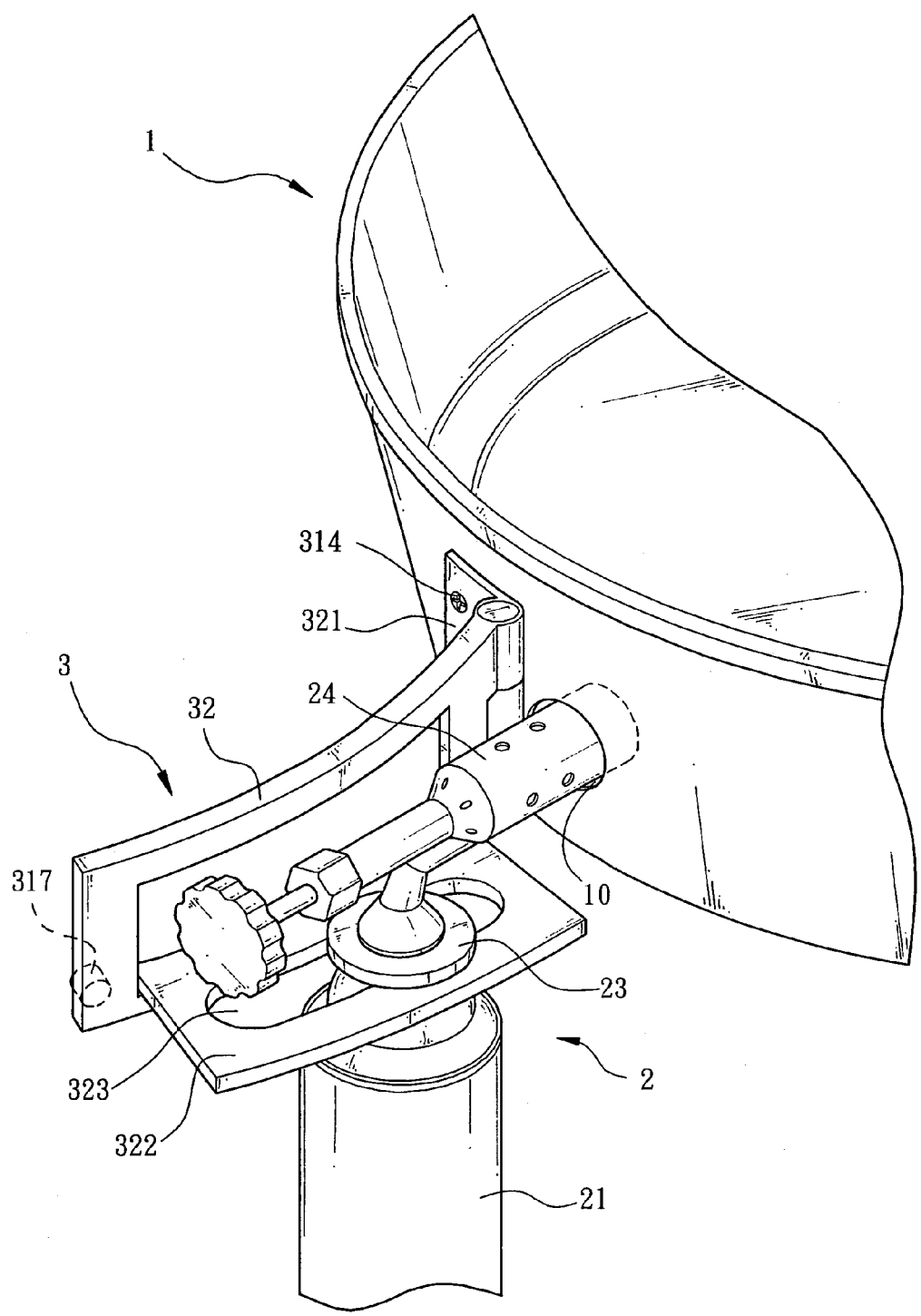
FIG. 4 is a perspective view of a second preferred embodiment of burner according to the invention mounted at a periphery of a barbecue stove.

Referring to FIG. 4, a second preferred embodiment of the invention is shown. The external bracket 3 comprises a second body 32 having a pivot member (e.g., hinge) 321 at one end proximate the opening 10 of the stove 1. The pivot member 321 is secured to the stove 1 by means of at least one fastener (e.g., screw) 314. Thus, pivoting the external bracket 3 will move the burner 2 close to and align with the opening 10. A plate 322 is extended from the second body 32 and is perpendicular thereto. Both the plate 322 and the opening 10 are disposed at the same side of the second body 32. An elongated slit 323 opened on the plate 322 provides both the fuel reservoir 21 and the disc member 23 slidably secured therein. Thus, the burner 2 may slidably move along the slit 323. In use, a user may move the burner 2 to align with the opening 10 by pivoting the external bracket 3 about the opening 10. Next, move the burner 2 along the slit 323 to close the opening 10 until the nozzle 24 moves into the space 13 through the opening 10 (see FIG. 1). Finally, activate the burner 2 to burn the fuel. Moreover, in the embodiment, the side of the second body 32 facing the peripheral wall of the stove 1 is built a shape as substantially curved as that of the peripheral wall of the stove 1. At least one engagement member (e.g., magnetic member) 317 is projected from a lower corner at the other side of the second body 32 opposite the plate 322. In a non-operating status of the burner 2, a user may pivot and move both the external bracket 3 and the burner 2 away from the opening 10 in order to dispose the external bracket 3 at a position distal the opening 10 of the stove 1. Finally, attach the engagement member 317 to the peripheral wall of the stove 1 so as to secure the second body 32 thereto.

Figure 5:
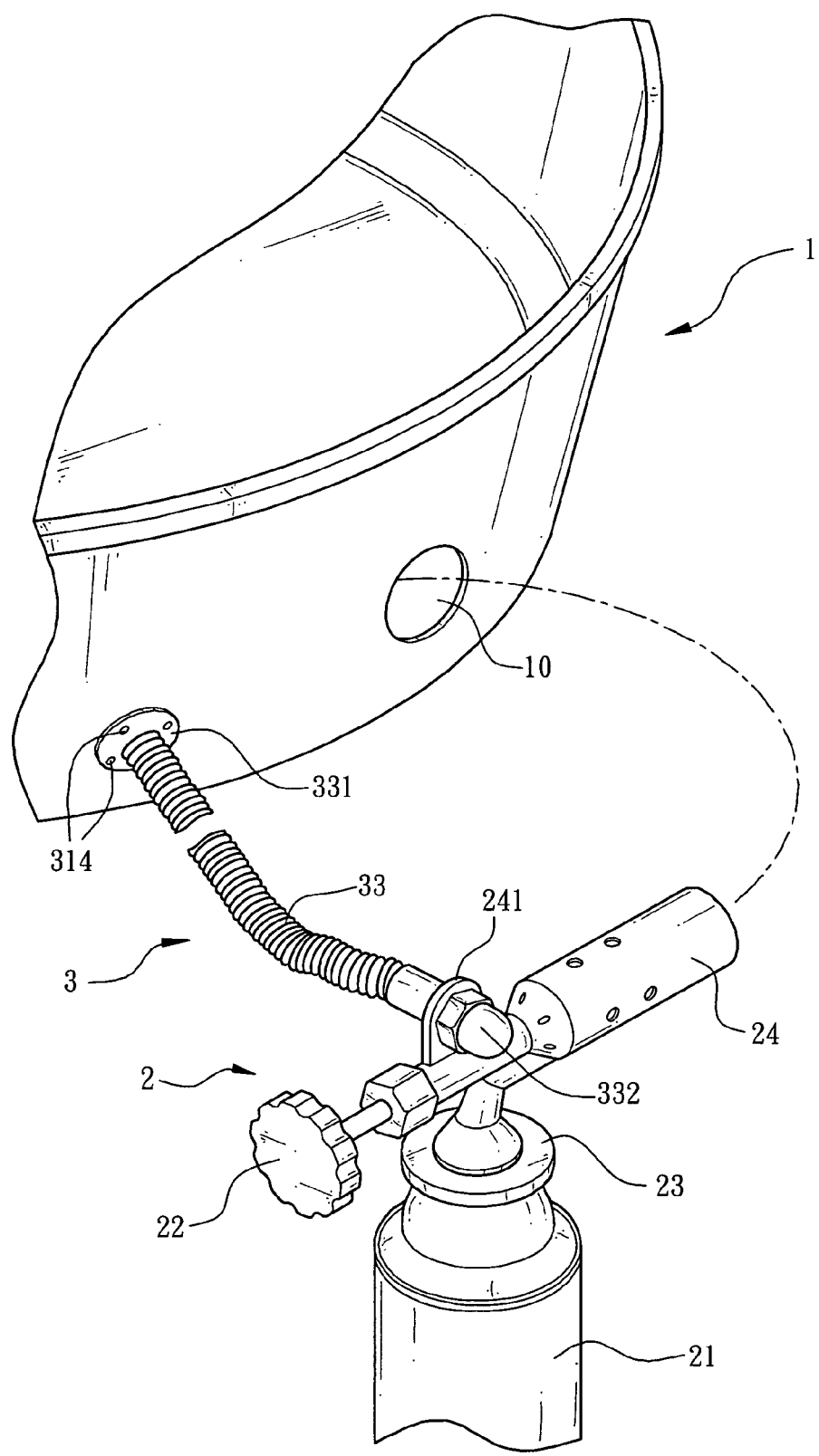
FIG. 5 is a perspective view of a third preferred embodiment of burner according to the invention mounted at a periphery of a barbecue stove.

Referring to FIG. 5, a third preferred embodiment of the invention is shown. The external bracket 3 comprises a hose-shaped flexible third body 33 adapted to bend freely. One end of the third body 33 is formed as a mounting plate 331. A plurality of fasteners (e.g., screws) 314 are driven through the mounting plate 331 into the peripheral wall of the stove 1 for securing the mounting plate 331 to the stove 1 proximate the opening 10. The other end of the third body 33 is formed as a threaded member 332 adapted to secure to the burner 2 and support same. Bending the third body 33 toward the opening 10 will move the nozzle 24 into the space 13 through the opening 10 (see FIG. 1). Finally, activate the burner 2 to burn the fuel. To the contrary, in a non-operating position of the burner 2 bending the third body 33 away from the opening 10 will move the nozzle 24 onto the peripheral wall of the stove 1 for hanging the burner 2. Moreover, a hole-shaped mounting element 241 is provided proximate the nozzle 24 of the burner 2 opposite the fuel reservoir 21. The other end of the third body 33 is adapted to pass the mounting element 241 to threadedly secure to the threaded member 332 for fastening the burner 2.

In each of the above embodiments, the external bracket 3 is implemented as a first body 31, a second body 32, or a third body 33. One end of the external bracket 3 is secured to the peripheral wall of the stove 1 and the other end thereof with the burner 2 mounted thereto is movable so as to freely move the nozzle 24 through the opening 10 into the space 13 (see FIG. 1). Two purposes can be achieved by any of the above embodiments as detailed below.

First, in use a user may pivot the external bracket 3 to move the nozzle 24 of the burner 2 through the opening 10 into the space 13 for burning the fuel 12 as shown in FIG. 1.

Second, in a non-operating position the user may pivot the external bracket 3 away from the opening 10. As such, one end (i.e., the nozzle) of the burner 2 will not be clogged by objects (e.g., ash, soybean, or like) in the stove 1. Otherwise, the burning function of the burner 2 may be disabled.

While the invention herein disclosed has been described by means of specific embodiments, numerous modifications and variations could be made thereto by those skilled in the art without departing from the scope and spirit of the invention set forth in the claims.

What is claimed is:

1. A barbecue stove comprising:

a stove having an internal space, an opening formed on its peripheral wall and two elongate plate-shaped braces extended from its bottom, wherein the braces are in parallel with the opening disposed above a point therebetween;

an external bracket having one end provided near the peripheral wall of the stove proximate the opening and adapted to move close to or away from the opening, wherein the external bracket comprises a plate-shaped first body having one corner at one end pivotably secured to one of the braces, such that the external bracket is adapted to pivot about the one of the braces to move close to or away from the opening, and two grooves extended from two corners at the other end of the first body distal the stove; and a burner provided at the other end of the external bracket and including a nozzle at one end, a fuel reservoir filled with fuel, a disc member having a top in fluid communication with the nozzle and a bottom opposite the nozzle in fluid communication with a top open end of the fuel reservoir, and a controller provided at a distal end of the nozzle and adapted to adjust an amount of the fuel fed to the nozzle, wherein the disc member is adapted to feed the fuel from the fuel reservoir to the nozzle and comprises two opposite sliding blocks with the nozzle disposed above a point therebetweeen, and two rails each formed on a bottom of the sliding block facing the top end of the fuel reservoir and adapted to slide into the grooves or out of same, such that the burner is adapted to move close to the opening by sliding the sliding blocks along the grooves toward the opening or move away from the opening by sliding the sliding blocks along the grooves away from the opening; and wherein moving the external bracket in one direction will dispose the nozzle through the opening into the internal space.

2. The barbecue stove of claim 1, wherein the first body has the other corner at the one end fastened on the other brace such that the other brace is adapted to support both the first body and the burner and align the burner with the opening.

3. The barbecue stove of claim 2, further comprising a releasable fastener adapted to drive through one corner at one end of the first body into the other brace for securing one end of the first body to the other brace such that the burner is supported by the braces.

* * * * *